May 3, 1966  C. H. ANSINGH  3,249,071
PALLET SUPPORT
Filed May 8, 1963
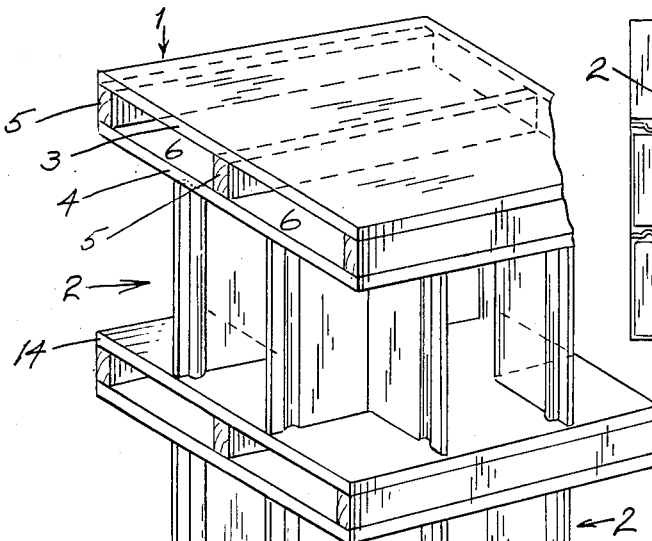
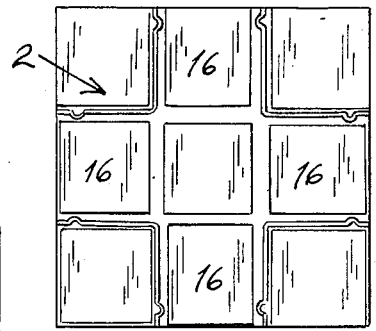
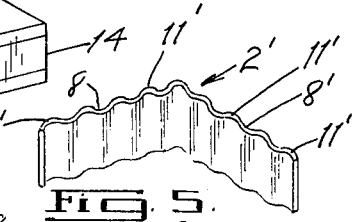
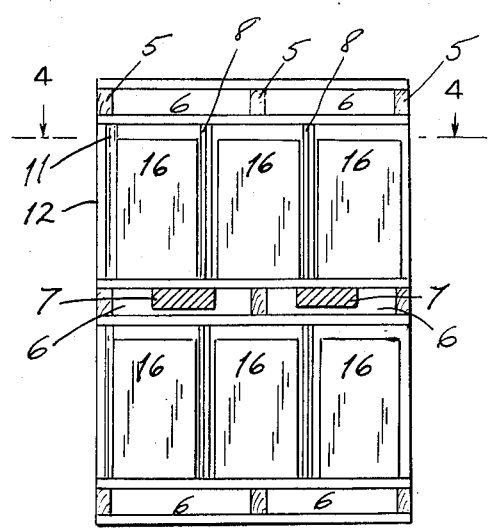
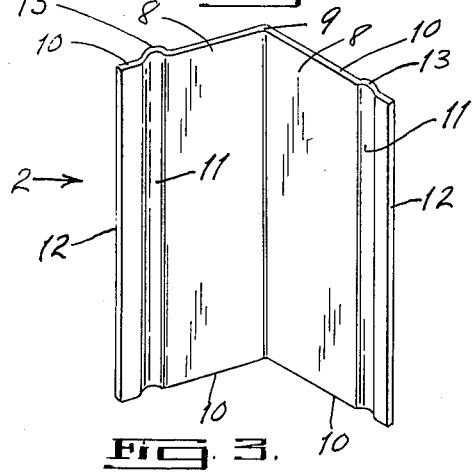
INVENTOR
Carl H. Ansingh
ATTY.

3,249,071
PALLET SUPPORT
Carl H. Ansingh, Milton, Ontario, Canada, assignor to P. L. Robertson Mfg. Co. Limited, Milton, Ontario, Canada
Filed May 8, 1963, Ser. No. 278,868
2 Claims. (Cl. 108—53)

This invention relates to a device for supporting pallets in superimposed or stacked relation.

Pallets are widely used in plants and warehouses for the storage and moving from place to place of a variety of goods. Generally, the goods are arranged on pallets and loaded pallets are stacked one upon the other. The stack is then moved, for example by means of a fork lift, to a storage or distribution area. It is desirable and efficient to have a high stack to take advantage of the most storage space. However, the height of the stack has heretofore been governed by the ability of the goods on the bottom pallet to withstand without damage, the weight of that portion of the stack resting upon it. Further, goods from a lower pallet of the stack cannot normally be removed without lifting the upper pallets and in some cases, rearranging the goods on such lower pallet.

It is the object of the present invention to enable pallets to be stacked to the full height of the available storage space without danger of crushing of the goods stored on the pallet and at the same time providing ready access to and removal of any and all goods on all of the pallets from the bottom to the top of the pallet stack.

Still another important object is to accomplish such pallet stacking with goods protection and availability by means of a pallet supporting device which is of itself of very simple and inexpensive construction and which can be very easily and conveniently handled in setting up the pallet stack.

Another important object is to provide a pallet supporting device as aforesaid which will securely support the pallets in a stable stack yet will permit any number of pallets to be lifted clear of the stack for transfer as by a fork lift truck without disturbing the underlying stack of pallets.

Again, it is an important object to provide a pallet supporting device which will effectively render the full pallet surface available for storing of articles thereon.

Still a further object is to provide a pallet support as aforesaid which when not in use can itself be conveniently stacked with like pallet supports for convenience and ease of storing.

Still another object is to provide a pallet support which in itself is a stable free standing device that can be placed in position without fasteners of any kind and will remain in its position until a pallet to be supported is lowered thereon and which through the medium of the load of the superimposed pallet will be positively anchored against displacement, but which on removal of the superimposed pallet can be removed for use elsewhere or storage without effort.

According to the invention the pallet support comprises a "corner" member constituted, for example, by a rectilinear plate of sheet steel, formed or bent to present two substantially right angularly disposed vertical wings with each wing having at least one vertical corrugation therein forming a vertical rib, the height of the wings being greater than the vertical dimension of the largest article to be placed on the pallet which it is desired to stack.

According to the invention four such pallet supports are placed on a pallet upon which another pallet is to be stacked, one pallet support being arranged at each corner of the under supporting pallet with the apex of the support disposed diagonally inwardly of the pallet corner and the pallet support wings extending perpendicularly to and having their free vertical edges substantially registering with the adjoining right angularly disposed edges of the pallet corner.

Usually the pallets are of square form and conveniently the width of the pallet wings may be one-third of the dimension of the side of the pallet whereby the four pallet supports when in position and supporting a superimposed pallet in effect define three compartments of equal size at each side of the pallets to receive the articles to be stored and to permit their removal without disturbing the remainder of the pallet stack.

These and other objects and features will become apparent from the following detailed description in which:

FIGURE 1 is a broken away perspective view of a pallet stack employing pallet supports in accordance with the invention;

FIGURE 2 is a side elevational view of a pallet stack supported by pallet supports in accordance with the invention and showing cartons disposed on the pallets and showing the tines of a fork lift about to lift the loaded pallet;

FIGURE 3 is a perspective view of a preferred embodiment of a pallet support incorporating the invention;

FIGURE 4 is a sectional plan view along the line 4—4 of FIGURE 2; and

FIGURE 5 is a perspective view of an alternative form of pallet support embodying the invention.

With reference to FIGURES 1 and 2, there is illustrated a plurality of pallets 1 supported in superimposed or stacked relation by means of pallet supports generally designated as at 2.

The pallets 1 are of conventional form being preferably square and comprising spaced upper and lower platforms 3 and 4, respectively, secured together by spacers 5. The double deck pallets 1 thus provide openings 6 to receive the tines 7 of a fork lift or the like whereby the pallet can be handled by the fork lift without interfering with the articles or goods stored on the pallet.

With reference to FIGURE 3, the pallet support 3 is shown as comprised of a right angular or cornered structure formed of sheet material to present two right angularly disposed wings 8 whose juncture forms the apex 9. As illustrated in FIGURES 1 and 2 in use the pallet support 3 is adapted to be stood on an edge 10 with the apex 9 vertical and the planes of the wings 8 also vertical.

Each of the wings 8 is formed with a smoothly curved vertical corrugations 11 adjacent to the outer or free vertical edge 12, the corrugation being parallel to the vertical juncture line or apex 9.

The pallet support 3 may, for example, be conveniently formed of a rectilinear sheet of suitable gauge sheet steel, the sheet being folded to provide the apex 9 and deformed to provide the vertical corrugations or ribs 11.

Alternatively, other forms of sheet metal may be used or the support could be formed from a plastic material exerting the requisite toughness and strength.

As, of course, the material to be handled on pallets is likely to be of a considerable weight and it may be desirable to stack a considerable number of pallets one on top of the other, the pallet supports 2 must be capable of withstanding quite a substantial end edge loading without distortion. In this connection, of course, the forming of the wings 8 into their right angular or substantially right angular relationship imparts an inherent rigidity and strength to the pallet support 2. Further, the wings 8 are strengthened or reinforced against deformation by the incorporation of the vertical corrugations 11. The net result is that a pallet support formed from relatively thin sheet steel will support a very substantial load when employed in a pallet stack, as illustrated in FIGURES 1 and 2.

The pallets 1 are normally formed of wood and therefore because the pallet supports 2 are formed of relatively thin material there is a tendency for the edges 10 of the pallet supports to dig into the wood of the platform. The vertical corrugations 11, however, provide curved edge formations 13 which interrupt the straight line of the edge 10. These curved edge deviations 13 together with the right angled bend or corner formation defined at the apex 9, effectively distribute the stresses tending to force the pallet support edges 10 into the wood in different directions relative to the wood grain to prevent these edges from biting into the wood. Thus the corrugations 11 and as well the apex 9 provide a second important function of precluding edge penetration of the support into the pallet as well as providing effective strengthening of the pallet support against deformation under load.

In use, four pallet supports are placed one at each corner of the lowermost pallet with the corner or apex 9 of the pallet supports disposed diagonally inwardly of the pallet corners 14 and with the wings 8 of the pallet supports perpendicular to the pallet edges 15, the outer free vertical edges of the wings 8 being flush with the pallet edges 15.

The general shape of the wings 8 is rectangular with each of the wings preferably being identical with the other. The height of the wings 8 will, of course, be determined by the nature and height of the articles to be stored on the stacked pallets. As illustrated in FIGURES 1 and 4, the widths of the wings may conveniently be one-third the dimension of one side of the square of the pallets 1 so that when the four pallet supports 2 are arranged as shown in FIGURE 4, three equal size compartments are, in effect, presented at each side of the pallet.

In the stack illustrated in FIGURES 2 and 4, the pallets 1 are shown as loaded with cartons 16 of rectangular formation with each carton being conveniently received in a "compartment" defined at the corners of the pallets by the wings 8 of the pallet support 2 and defined centrally of the pallet corners by the spacing between the wings of adjoining pallet supports. A ninth carton can be received in the centre of the pallet as shown in FIGURE 4.

In a particular example in which the pallet supports have been tested to support pallets loaded with cartons of screws, fasteners or the like, having very substantial weight, the pallet supports were formed of ⅛ inch sheet steel bent into wings 8 having a height of 17½" and a width of 8¾". The vertical corrugation 11 extended from a point approximately 6⅜" to a point approximately 7⅞" from the apex or corner 9. Such pallet supports were found capable of assuming very large loads without buckling or deformation and substantially without edge penetration of the pallets.

With the arrangement illustrated, one or more superimposed pallets and their load can be lifted by the tines of a fork lift 7, as illustrated in FIGURE 2, in the normal pallet handling manner. At the same time, a single carton 16 may be removed from any level of the pallet stack without requiring that the superimposed pallets be removed and without in any way affecting the proper support of the pallet stack.

Further, of course, the cartons 16 are not required to bear any load from the superimposed pallets and the superimposed pallets are maintained perfectly parallel and the weight of these pallets and their loads will preclude any shifting of the pallet supports 2 so that the pallet stack is stable and the cartons or other articles supported from a horizontal support.

FIGURE 5 illustrates a modified form of pallet support 3' again having wings 8' arranged in substantially right angular relation but these wings instead of having a single vertical corrugation near their free edge are provided with a plurality of vertical corrugations 11' to further stiffen the wings and increase their resistance to edge penetration.

It will be understood that various other detailed changes in the structure may be made to shape or suit the pallet support to the particular application without departing from the spirit of the invention or scope of the appended claims.

What I claim is:

1. In a pallet stack comprising at least one rectilinear pallet superimposed upon a corresponding lower rectilinear pallet, said upper superimposed pallet being supported from said lower pallet by means of four pallet supports each comprising a pair of integrally connected vertical wings having their planes arranged in substantially right angular relation to present a corner formation, each of the wings of each pallet support extending substantially perpendicularly inwardly from an edge of the superimposed pallets with the corner formation formed by such wings disposed inwardly from the respective pallet corner whereby there is presented at each corner of said pallets a compartment bounded inwardly of the pallet corners by said wings with a further compartment defined intermediately of the pallet corners between adjoining pallet supports, each of said wings having a single vertical corrugation adjacent the free edge thereof remote from said corner.

2. A pallet support comprising a member of rigid sheet material formed to present a pair of integral substantially right angularly disposed wings rendering the support capable of self support on edge with the wings disposed vertically and defining a vertical corner, each of said wings being provided with a corrugation therein extending from top to bottom thereof with said support on edge, said corrugation being parallel to said vertical corner and displaced therefrom a substantial distance and each corrugation being smoothly curved in horizontal section with a pallet support arranged on edge.

References Cited by the Examiner

UNITED STATES PATENTS

| | | | |
|---|---|---|---|
| 2,503,562 | 3/1947 | Porter | 108—53 |
| 2,579,685 | 12/1951 | Louse | 108—53 |
| 2,594,287 | 4/1951 | Budd | 108—53 X |
| 2,683,010 | 7/1954 | Hamerslag | 108—53 |
| 2,700,521 | 1/1955 | Layham | 108—53 |
| 2,756,894 | 7/1956 | Phillips | 220—6 |
| 2,926,792 | 3/1960 | Seiz | 108—53 |
| 2,935,283 | 5/1960 | Berry | 108—53 |

FOREIGN PATENTS 1,103,243   3/1961   Germany.

FRANK B. SHERRY, *Primary Examiner.*

G. O. FINCH, *Assistant Examiner.*